US012711598B2

(12) United States Patent
Weisman et al.

(10) Patent No.: US 12,711,598 B2
(45) Date of Patent: Aug. 18, 2026

(54) STRAIN MAPPING BY HYPERSPECTRAL IMAGING

(71) Applicant: William Marsh Rice University

(72) Inventors: R. Bruce Weisman, Houston, TX (US); Satish Nagarajaiah, Houston, TX (US); Wei Meng, Houston, TX (US); Sergei M. Bachilo, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 19/308,026

(22) Filed: Aug. 22, 2025

(65) Prior Publication Data

US 2026/0057502 A1 Feb. 26, 2026

Related U.S. Application Data

(60) Provisional application No. 63/686,093, filed on Aug. 22, 2024.

(51) Int. Cl.
*G06T 7/00* (2017.01)

(52) U.S. Cl.
CPC .. *G06T 7/0002* (2013.01); *G06T 2207/30184* (2013.01)

(58) Field of Classification Search
CPC .. G01L 1/14; G01L 1/25; G01L 1/248; G01Q 30/02; A61B 5/0071; A61B 5/7203; G06T 17/00
See application file for complete search history.

(56) References Cited

U.S. PATENT DOCUMENTS 7,538,891 B1 * 5/2009 Mello ................ G01B 9/02098 356/520
8,272,273 B2 * 9/2012 Chen ......................... G01L 1/14 73/777

(Continued)

OTHER PUBLICATIONS

Development_of_3D_hyperspectral_camera_using_compressive_sensing; Xi—2012; (Year: 2012).*

(Continued)

*Primary Examiner* — Luis Perez-Fuentes
(74) *Attorney, Agent, or Firm* — Osha Bergman Watanabe & Burton LLP

(57) ABSTRACT

A strain mapping system for producing a strain map of an object is provided. The strain mapping system may include a nanomaterial configured to be applied to a surface of the object as a film, an imager, one or more image processing algorithms and one or more computer processors communicatively coupled to the imager. The strain mapping system is configured to produce a strain map of the object. A method for producing a strain map of an object using the strain mapping system is provided. The method may include irradiating, a film of the nanomaterial disposed on a surface of the object wherein a fluorescence of a light is emitted from the film in response to irradiating the object. The method may further include calculating, using a reference wavelength and a spectral gauge factor, a plurality of local strain values. The method may yet further include producing, with the one or more image processing algorithms and the plurality of local strain values, a strain map of the object.

19 Claims, 9 Drawing Sheets

(56) References Cited

U.S. PATENT DOCUMENTS

| | | | | |
|---|---|---|---|---|
| 9,255,853 | B2 * | 2/2016 | Weisman | G01L 1/248 |
| 9,482,585 | B2 * | 11/2016 | Singh | G01D 5/34 |
| 10,139,295 | B2 * | 11/2018 | Yu | G01L 1/241 |
| 10,274,368 | B2 | 4/2019 | Jussila | |
| 10,321,826 | B2 * | 6/2019 | Won | A61B 5/444 |
| 10,675,002 | B2 * | 6/2020 | Mahmoud | A61B 8/485 |
| 11,054,440 | B2 * | 7/2021 | Liu | G01Q 20/02 |
| 11,406,318 | B2 * | 8/2022 | Tearney | A61B 5/0066 |
| 12,059,230 | B2 * | 8/2024 | Strano | A61B 5/7203 |
| 2004/0038251 | A1 * | 2/2004 | Smalley | G01N 33/588 435/7.1 |
| 2010/0141939 | A1 * | 6/2010 | Zhan | G01Q 30/02 850/52 |
| 2015/0044098 | A1 | 2/2015 | Smart et al. | |
| 2022/0303440 | A1 | 9/2022 | Song | |

OTHER PUBLICATIONS

Hyperspectral image representation and Processing with Binary Partition Trees; 2013; (Year: 2013).*

Strain Measurements on Individual SWCNT nanotubes in a polymer host; 2008; (Year: 2008).*

Two-dimensional digital image correlation for in-plane displacement and strain measurement; 2009 (Year: 2009).*

* cited by examiner

200

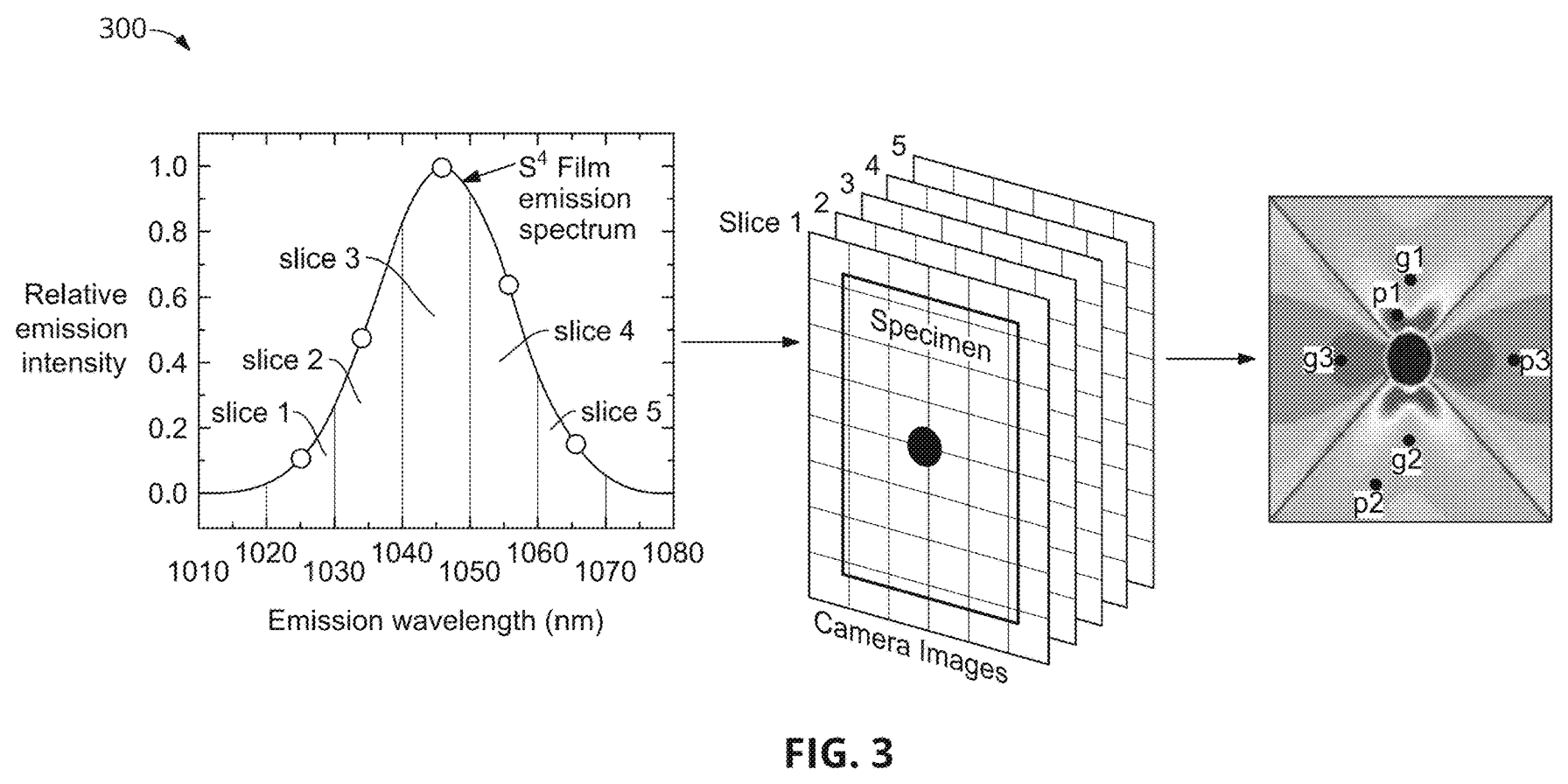

300

Relative emission intensity 1.0 0.8 0.6 0.4 0.2 0.0

1010 1020 1030 1040 1050 1060 1070 1080

Emission wavelength (nm)

$S^4$ Film emission spectrum slice 1 slice 2 slice 3 slice 4 slice 5

Slice 1 2 3 4 5

Specimen

Camera Images g1 p1 g2 p2 g3 p3

FIG. 3

STRAIN MAPPING BY HYPERSPECTRAL IMAGING

STATEMENT REGARDING FEDERALLY SPONSORED RESEARCH

This invention was made with government support under the NSF I-Corp program, Grant No. 2227454.

BACKGROUND

Many cases of structural failure in buildings, bridges, ships, and aircraft are closely related to stress-strain concentration. As a direct indicator of the effects of stress concentration, strain measurement plays an important role in structural health monitoring (SHM) and non-destructive testing. For this reason, many analytical, numerical, and experimental studies have been conducted over the past decades to investigate structural strain and damage induced by various loading conditions. Conventional contact-based methods used for strain mapping measure strain pointwise in an individual direction, which leads to high cost and low spatial resolution when full-field strain mapping is needed. These methods often require prior knowledge of the locations of stress concentration. Conventional non-contact methods, such as interferometric methods, can be highly sensitive to strain field variation, but are only suitable for small-scale model structure measurement in laboratory environments. Other non-contact methods, such as digital image correlation (DIC), rely on complex numerical image processing to measure the strain the accuracy depends strongly on image quality. Accordingly, there is a need for more direct, non-contact full-field strain mapping techniques with stronger optical signals, faster data acquisition, and higher strain sensitivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a strain mapping system for producing a strain map of an object. The strain mapping system includes: a nanomaterial configured to be applied to a surface of the object as a film, an imager, one or more image processing algorithms and one or more computer processors communicatively coupled to the imager. The imager includes a polarized light source configured to irradiate the film with polarized light, a camera configured to record a fluorescence of a light reflected emitted from the film, and a tunable spectral filter configured to measure pass a range of wavelengths of the light emitted from the film. The imager is configured to acquire a background image and a plurality of spectrally indexed object images. The one or more computer processors is configured to process, with the one or more image processing algorithms, the background image and the plurality of spectrally indexed object images. The strain mapping system is configured to produce a strain map of the object.

In another aspect, embodiments disclosed herein relate to a method for producing a strain map of an object using a strain mapping system including a nanomaterial, a camera, a polarized light source, a tunable spectral filter, one or more image processing algorithms and one or more computer processors communicatively coupled to the imager, The method includes acquiring, with the camera, a background image. The method further includes irradiating, with the polarized light source, a film of the plurality of single-walled carbon nanotubes disposed on a surface of the object wherein a fluorescence of a light is emitted from the film in response to irradiating the object. The method further includes acquiring, with the camera, a plurality of spectrally indexed object images of the object wherein the plurality of spectrally indexed object images has a calibration dataset of spatial and spectral calibration data. The method yet further includes correcting, with the one or more image processing algorithms, intensities of the plurality of spectrally indexed object images using the background image and the calibration dataset. The method yet further includes identifying, with the one or more image processing algorithms, a spectral index with a maximum intensity for a plurality of pixels in the spectrally indexed object images. The method yet further includes determining, with the one or more image processing algorithms, an interpolated index of a true maximum intensity, and determining, with the calibration dataset, a reference wavelength of the interpolated index of the true maximum intensity. The method yet further includes calculating, using the reference wavelength and a spectral gauge factor, a plurality of local strain values. The method further includes producing, with the one or more image processing algorithms and the plurality of local strain values, a strain map of the object. The method yet further includes storing, on the one or more computer processors, the strain map of the object.

Other aspects and advantages of the claimed subject matter will be apparent from the following description and the appended claims.

BRIEF DESCRIPTION OF DRAWINGS

FIG. 3 depicts an example workflow in accordance with one or more embodiments.

DETAILED DESCRIPTION

Figure 1:
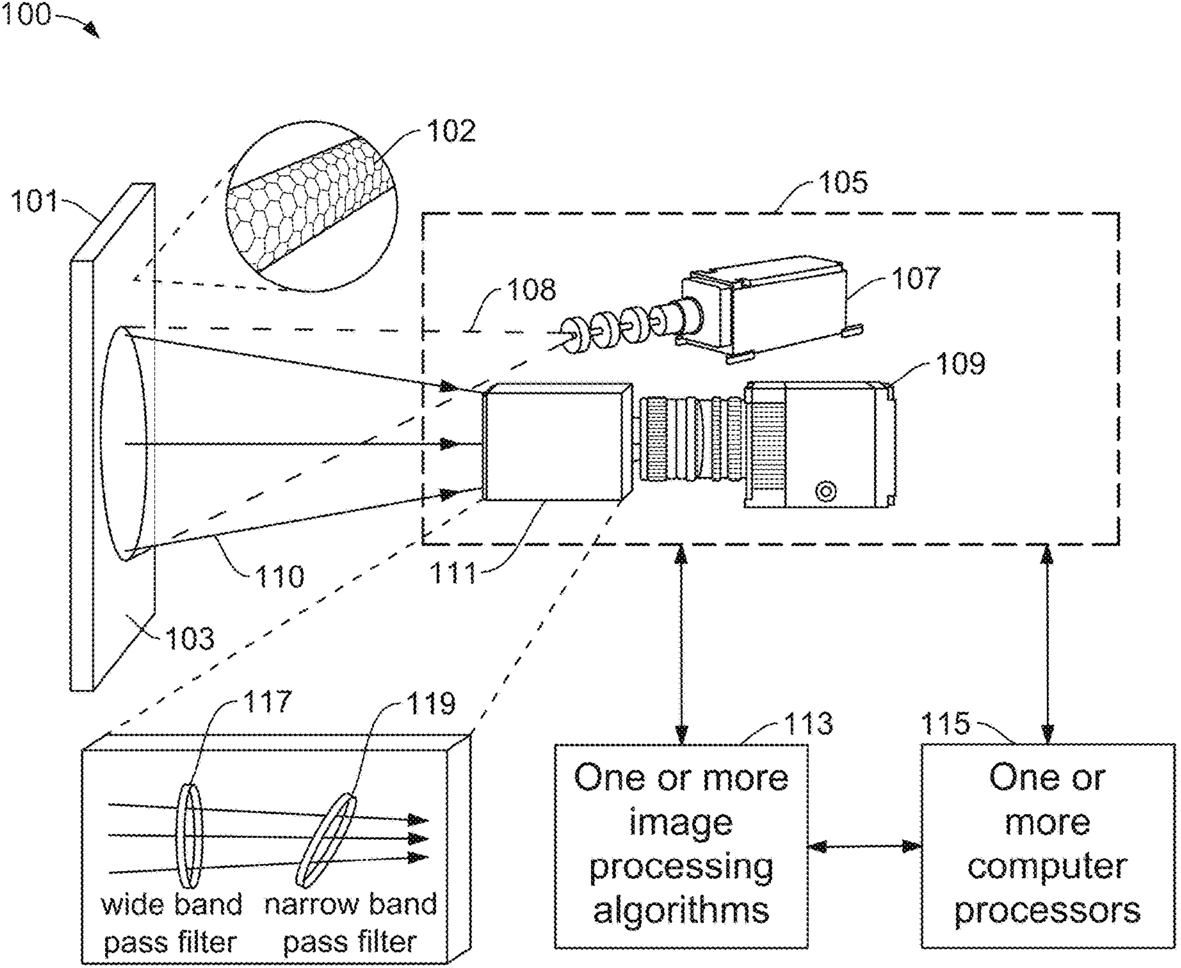
FIG. 1 depicts a strain mapping system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a processor" includes reference to one or more of such processors.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

In the following description of FIGS. 1-9, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Embodiments of the present disclosure may provide at least one of the following advantages.

Conventional strain measurement methods can be divided into two major categories: contact-based and non-contact techniques. Previous strain sensing methods sequentially measure photoluminescence spectra from a series of known positions and spatially interpolating the deduced strain values, rather than measuring the strain for an area.

In contact-based strain sensing, piezoresistive and fiber Bragg grating (FBG) sensors are the most widely used. However, for both piezoresistive and FBG sensors, the strain is measured pointwise in an individual direction, which leads to high cost and low spatial resolution when full-field strain mapping is needed. These sensors are most useful when users have prior knowledge of the locations of stress concentration and can deploy them directly in such locations.

Conventional non-contact methods, such as interferometric methods can be highly sensitive to strain field variation but are only suitable for small-scale model structure measurement in laboratory environments. The most widely accepted and commonly used image-based method is digital image correlation (DIC), which provides full-field displacement and strain maps. However, DIC is an indirect method that relies on complex numerical image processing and the accuracy depends strongly on image quality. Additionally, DIC does not provide the strain values at edges.

In a more direct optical approach to strain measurement, spectroscopy-based methods have been developed to overcome some limitations of image-based and interferometric techniques. Single-walled carbon nanotubes (SWCNTs) show systematic shifts in their vibrational and electronic spectra in response to mechanical deformation. SWCNTs that are attached to a surface can therefore be used as tiny, optically interrogated strain sensors. Much stronger optical signals, faster data acquisition, and higher strain sensitivity have been obtained by using SWCNT near-IR fluorescence spectra to deduce strain. In this "strain-sensing smart skin" or S4 method, emission from SWCNTs embedded in a thin polymer film on the object surface is captured and spectrally analyzed to find the local strain magnitude at the desired locations and directions. Because the nanotube sensors are distributed across the entire coated surface, strain values can be measured at arbitrary locations and directions, and combined to give high-resolution full-field strain maps. An advantage of the systems and methods disclosed herein is that each local strain value is independently determined and does not depend on nearby measurements. That is, strain values at edges with steep strain gradients can be measured properly which is not possible with conventional methods.

Embodiments disclosed herein generally relate to systems and methods for producing a strain map of an object using a strain mapping system. The strain mapping system produces a strain map using an imager to acquire strain information at many locations simultaneously by irradiating a film of SWCNTs disposed on a surface of the object with a polarized light source. The emission spectrum of the SWCNTs as a function of strain is well known. Thus, monitoring the spectrum of emissions from the irradiated surface of the object before and after applying stress enables the determination of the strain. Using a plurality of image processing algorithms, images of the illuminated object are processed at the pixel level to measure local spectral shifts which are converted into local strain values. The local strain values are then compiled into a strain-map. A person of ordinary skill in the art would recognize that the strain mapping can be performed during the application of a stress to the object to determine an elastic strain and plastic or residual strains.

FIG. 1 shows a strain mapping system (100) for producing a strain map of an object (101). The object includes, but is not limited to, an aircraft wing, engines, moving parts, buildings, pipelines, concrete, metals and other infrastructure. The strain mapping system (100) includes a nanomaterial (102) configured to be applied to a surface of the object as a film (103), an imager (105), one or more image processing algorithms (113) and one or more computer processors (115) communicatively coupled to the imager (105). The one or more image processing algorithms (113) include, but is not limited to, curve-fitting algorithms, noise reduction algorithms, interpolation algorithms, etc. A person of ordinary skill in the art would recognize that these algorithms may be used for one-dimensional, two-dimensional or three-dimensional data. One-dimensional data may include intensities in a pixel row or column of an image. Two-dimensional data may include an image. Three-dimensional data may include an array of stacked, spectrally indexed images (i.e., a datacube).

In one or more embodiments, the imager includes a polarized light source (107), a camera (109) and a tunable spectral filter (111). The polarized light source (107) is configured to irradiate the film (103) with polarized light (108). The camera (109) is configured to record a fluorescence of a light emitted (110) from the film (103). The tunable spectral filter (111) is configured to measure a range of wavelengths of the light emitted (110) from the film (103). The tunable spectral filter (111) may further comprise a wide band pass filter (117) and a narrow band pass filter (119). In general, the imager (105) is configured to acquire a background image and a plurality of spectrally indexed object images. The background image is subtracted from each of the images in the plurality of spectrally indexed object images which allows for subtraction of dark noise and any background light leakage. The imager may be disposed under a light shield. Further, the one or more computer processors (115) is configured to process, with the one or more image processing algorithms (113), the background image and the plurality of spectrally indexed object images.

In general, the strain mapping system (100) is configured to produce a strain map of the object (101). Applying stress to the object will transmit the stress to the nanomaterial (102) contained in the film (103), producing a measurable strain in the nanomaterial (102). In some embodiments, the nanomaterial (102) is single-walled carbon nanotubes (SWCNTs). A person of ordinary skill in the art would recognize that any nanomaterial with strain sensitive properties may be used. For example, some monolayer transition transition metal dichalcogenides (two-dimensional nanomaterials) such as MoS2 (molybdenum sulfide) may be used as their band gaps and emission wavelengths are sensitive to strain. The applied strain is transmitted to the nanomaterial, altering the semiconducting band gaps and causing systematic shifts in the characteristic emission spectra. These shifts are recorded by irradiating a point on the surface with a small laser and capturing the resulting nanotube emission with the imager (105). In some implementations, the strain mapping system (100) is configured to produce a strain map for a plurality of angles of polarization of the polarized light source (107). The strain map obtained from the plurality of angles of polarization can be used to determine the magnitudes and principal axes of strain as a function of position on the object (101). This strain map may further reveal the presence of strain anisotropy, i.e., local irregularities in strain values that are important for damage detection and structural health monitoring.

In accordance with one or more embodiments, the film (103) includes sorted SWCNTs. The film (103) may further include a multi-layer coating including an opaque base layer, a high gloss primer layer and a sensing layer. The multi-layer coating avoids photoluminescence quenching that is observed in previous single-layer films containing SWCNTs. The opaque base layer may be an opaque paint. The high-gloss primer layer may be a high gloss polyurethane. The sensing layer may be a "strain-sensing smart skin" (S4) film which can be sprayed onto a substrate to form a film less than 0.4 μm thick. This very thin sensing layer enhances accurate strain transfer from the object (101) to nanotube sensors, as mechanical strain transferred from the object (101) to the coating relaxes inside the film (103) from the interface to the top surface. Compared to conventional methods, the S4 film offers reduced curing times and superior scalability suggesting the feasibility of spray-coating S4 films onto large surfaces such as civil infrastructures, mechanical systems, and aerospace structures.

Figure 2:
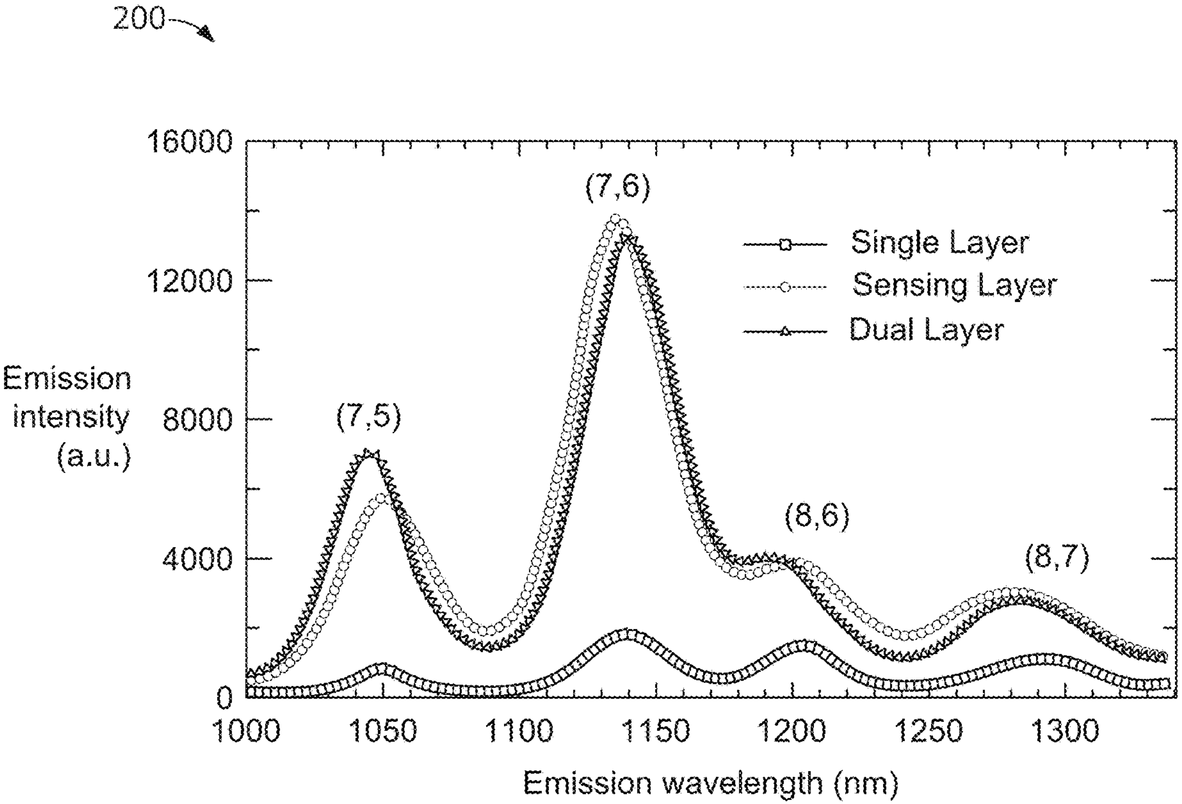
FIG. 2 depicts example data in accordance with one or more embodiments.

In an example embodiment, as shown in FIG. 2, a multi-layer film (curve with circle markers) outperforms a single-layer film (curve with square markers). Peaks from the (8,6) and (8,7) species weakened and broadened, making them less suitable for use in deducing strain, whereas those from the (7,5) and (7,6) species remain intense and distinct, and superior to peaks from previous S4 films prepared from unsorted SWCNTs.

In some embodiments, a protective top layer may be useful to shield the sensing layer from environmental degradation. The top layer must be transparent enough at red (excitation) and short-wave infrared (photoluminescence) wavelengths to permit spectral strain measurements on the sensing layer below. As shown in FIG. 2, the topcoat does not suppress photoluminescence from the sensing layer or contribute significant background emission (curve with triangle markers). In some embodiments, the multi-layer films may be applied on top of a thin anticorrosion base coat, as typically used for aerospace applications.

In some cases, the curing of the protective top layer causes shifts in emission wavelengths of the SWCNTs in the sensing layer which may be attributed to mechanical strain exerted during top layer curing. For example, as shown in FIG. 2, the average (7,6)-(7,5) peak separation changes from 85.0 to 95.4 nm. If due entirely to compression, this change would imply strains of ~6,500με in the sensing layer, presumably caused by evaporation of solvent as the top layer cures. This initial strain can be considered a baseline level that does not interfere with measurements of subsequently induced strains in the substrate.

Following the application and curing of the S4 film containing the nanomaterial (102), for example SWCNTs, an area of the object (101) is irradiated with polarized light (108). The polarized light (108) may be in the visible wavelength range. In some implementations, the polarized light source (107) may be an excitation laser configured to emit polarized light (108) within a predetermined wavelength band. The predetermined wavelength band may be within an infrared wavelength range or a visible wavelength range. By irradiating the object (101) with a laser, a spectrum of emissions may be observed, i.e., a light emitted (110) from the film (103) is observed.

The imager (105) acquires spectrally indexed object images with the camera (109) and the tunable spectral filter (111). Each image of the spectrally indexed object images is acquired with the tunable spectral filter (111) so that different portions of an emission band of the nanomaterial (102) are observed. For example, as shown in FIG. 3, each of the spectrally indexed object images captures the emission within a predetermined wavelength region or 'slice'. These images are recorded and then digitally processed at the pixel level to deduce local shifts in the nanotube-emission peak wavelengths. Using calibration procedures, further described below, the spectral shifts may be converted into local strain values. The set of pixel-specific strain values may then be compiled to form a color-coded strain map of the object surface.

Figure 4:
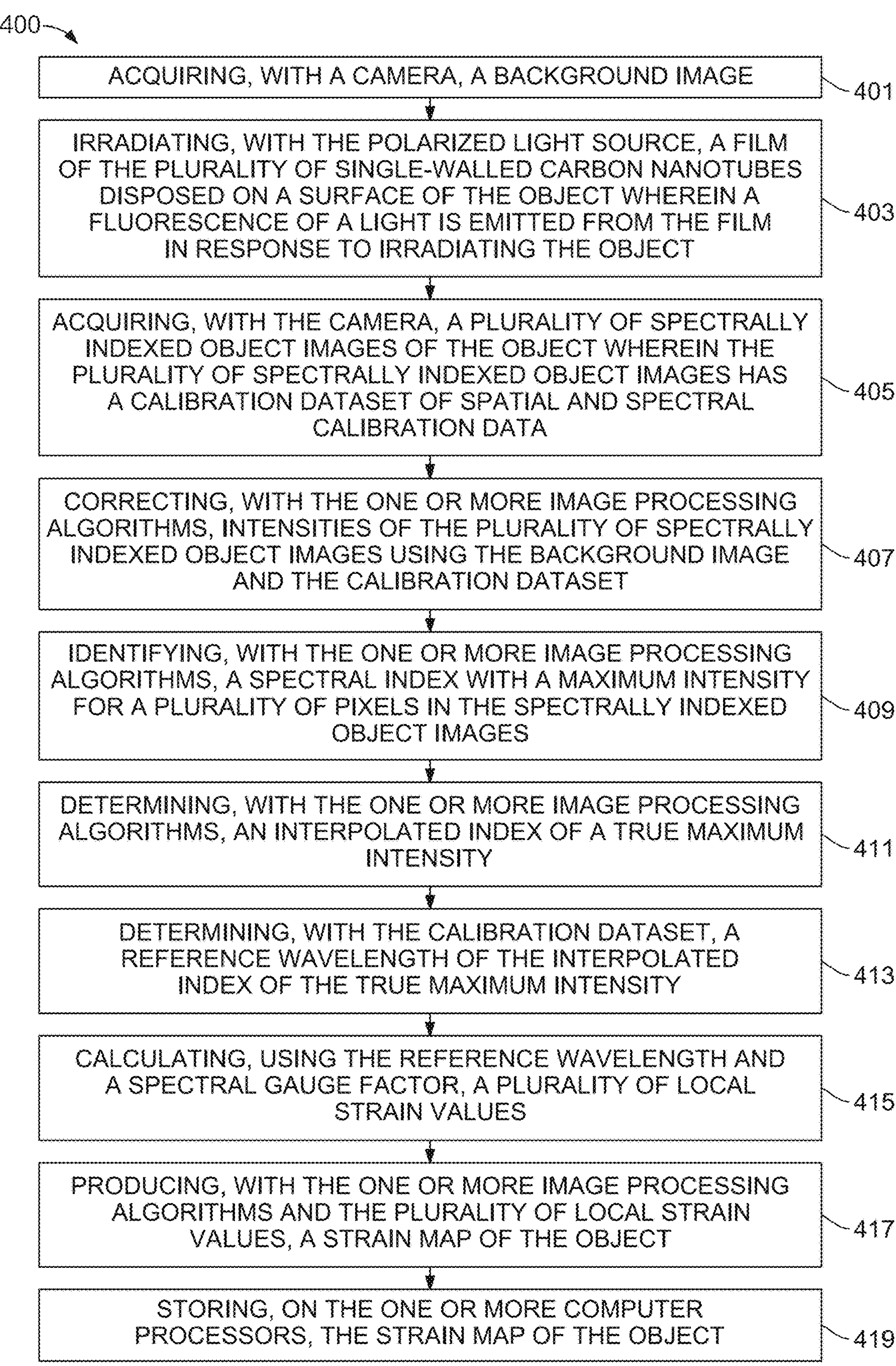
FIG. 4 depicts a flowchart of a method in accordance with one or more embodiments.

FIG. 4 depicts a method (400) in accordance with one or more embodiments. The steps of the method (400) can be performed using a strain mapping system as previously described. As depicted in Step 401, a background image is acquired with a camera. In Step 403, the polarized light source irradiates a film of the plurality of single-walled carbon nanotubes disposed on a surface of the object wherein a fluorescence of a light is emitted from the film in response to irradiating the object. In Step 405, the strain mapping system acquires, with the camera, a plurality of spectrally indexed object images of the object wherein the plurality of spectrally indexed object images has a calibration dataset of spatial and spectral calibration data.

In Step 407, the strain mapping system corrects with the one or more image processing algorithms, intensities of the plurality of spectrally indexed object images using the background image and the calibration dataset. The intensity of the fluorescence at each pixel in each spectrally indexed object image is corrected for spectral and spatial sensitivity factors.

In Step 409, a spectral index with a maximum intensity for a plurality of pixels in the spectrally indexed object images is identified with the one or more image processing algorithms. That is, the image with maximum fluorescence signal is identified. For example, as shown in FIG. 3, the third image or ‘slice 3’ shows the maximum fluorescence and the spectral index of ‘slice 3’ would be identified by Step 409. In some implementations, the intensities for a pre-defined number of indexed images near the image with the maximum fluorescence signal are also identified.

In Step 411, an interpolated index of a true maximum intensity is determined using the one or more image processing algorithms. The interpolated index of the true maximum intensity may be determined by fitting, with the one or more image processing algorithms, a curve for a plurality of intensities versus a plurality of index points. In some embodiments the curves may be a second-order polynomial function or a third-order polynomial function. The curve may be used to find a fractional interpolated image index corresponding to a true maximum of the fit.

In Step 413, a reference wavelength of the interpolated index of the true maximum intensity is determined with the calibration dataset. This is done by converting the fractional interpolated image index into a wavelength using previously measured calibration data. This step gives the wavelength as a function of pixel x-value, pixel y-value, and image spectral index.

In Step, 415, a plurality of local strain values is calculated using the reference wavelength and a spectral gauge factor. The spectral gauge factor is described below. The plurality of local strain values is calculated by correlating the fluorescence of the light emitted from the film to the presence of strain and determining a wavelength of the light emitted from the film. A shift of the wavelength of the light emitted from the film indicates a local strain.

In Step 417, a strain map of the object is produced with the one or more image processing algorithms and the plurality of local strain values. In Step 419, the strain map of the object is stored on the one or more computer processors.

The method (400) for producing a strain map of the object may be repeated for a plurality of angles of polarization of the polarized light source. The combined strain map generated by combining the strain maps obtained for the plurality of angles of polarization may be used to identify a stress anisotropy in the object. In some implementations, if it is determined that the strain is above a predetermined threshold the object (101) may be decommissioned, replaced, repaired etc. as needed.

As described above stronger optical signals, faster data acquisition, and higher strain sensitivity have been obtained by using SWCNT fluorescence spectra to deduce strain. Using the strain mapping system (100), emission from SWCNTs embedded in a thin polymer film on the specimen surface is captured and spectrally analyzed to find the local strain magnitude at the desired locations and directions. Because the nanotube sensors are distributed across the entire coated surface, strain values can be measured at arbitrary locations and directions and combined to give full-field strain maps.

Prior to performing strain mapping, a simple calibration can be performed to correlate the spectral peak shifts with readings from a conventional resistive foil gauge. The change in separation between the (7,6) and (7,5) peak wavelengths is proportional to the specimen strain, with a “spectral gauge factor” defined by the slope:

$$\gamma = -\frac{\delta(\lambda_{(7,6)} - \lambda_{(7,5)})}{\delta\varepsilon}$$

Here $\lambda_{(7,6)}$ and $\lambda_{(7,5)}$ are the peak wavelengths of emission from (7,6) and (7,5) SWCNTs in the sensing film and $\varepsilon$ is the object strain. The value of the spectral gauge factor, $\gamma$, should be consistent for different embodiments prepared with the same base coating material and film application protocol.

The object strain F can be determined using the background image, captured before a strain is applied to the object, and the plurality of spectrally indexed object images. In accordance with one or more embodiments, the plurality of local strain values is determined by using the separation between the (7,6) and (7,5) peak wavelengths as these peaks shift in opposite directions with nanotube axial strain, so their difference provides an improved sensitivity factor and can also cancel out effects from environmental changes that shift both peaks in the same direction. The strain map can be obtained by:

$$\varepsilon(x, y) = \frac{[\delta_1(x, y) - \delta_0(x, y)]}{\gamma}$$

Here, $\delta_0(x, y)$ is a reference strain map of the object that is obtained by point-wise raster scanning of the optical strain reader over the region of interest (ROI). At each point, the peak wavelengths of (7,6) and (7,5) SWCNT emission are determined and the wavelength difference is recorded as an element of a reference spectral array. After the specimen has been stress tested, it is scanned again with the same raster pattern to generate the final spectral array $\delta_1(x, y)$. The reference array elements are subtracted from the final array elements which is divided by the stress gauge factor, $\gamma$, to obtain the array of net induced strain values, i.e., the strain map.

Figure 5:
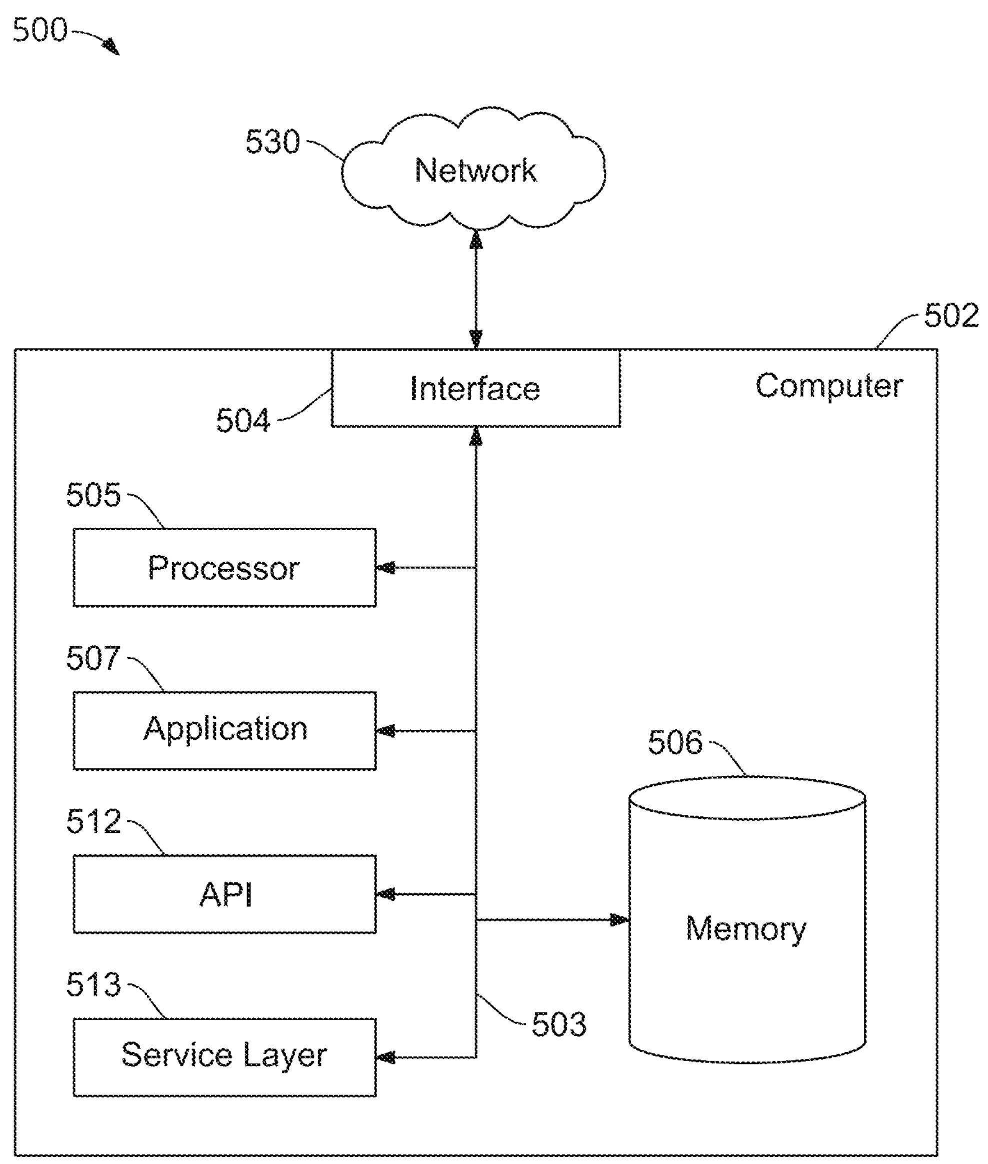
FIG. 5 depicts a computer system in accordance with one or more embodiments.

FIG. 5 depicts a block diagram of such a computer system used to provide computational functionalities associated with described algorithms, methods, functions, processes, flows, and procedures as described in this disclosure, according to one or more embodiments. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. The illustrated computer (502) may include graphics processing units (GPUs). Additionally, the computer (502) may include an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over a network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513)). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or another suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502). The memory (506) may include a non-transitory computer readable medium that stores instructions executable by a computer processor.

The application (507) is an algorithmic software engine providing functionality according to particular needs, desires, or particular implementations of the computer (502), particularly with respect to functionality described in this disclosure. For example, the application (507) can serve as one or more components, modules, applications, etc. Further, although illustrated as a single application, the application (507) may be implemented as multiple applications on the computer (502). In addition, although illustrated as integral to the computer (502), in alternative implementations, the application (507) can be external to the computer (502).

There may be any number of computers (502) associated with, or external to, a computer system containing computers (502), wherein each computer (502) communicates over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

Any combinations of the various embodiments and implementations disclosed herein can be used in a further embodiment, consistent with the disclosure. Other aspects and advantages of the claimed subject matter will be apparent from the following description and the appended claims.

EXAMPLES

The following examples compare strain maps measured using the strain mapping system (100) and method (400)

described above to simulated models and conventional methods (DIC). Specifically, in the examples described below the S4 method is an embodiment of the present invention. The S4 method is compared to a conventional method (digital image correlation, DIC) of measuring strain. In some of the examples below, the S4 method is further compared to simulations (finite element method, FEM).

The first comparison specimens were two 1.4 mm thick 'I'-shaped acrylic bars coated with the multi-layer S4 coating described above. For the first specimen, a square notch was cut into the side to concentrate stress under axial loading and thereby generate a characteristic strain pattern. For the second specimen, a circular hole was drilled at the center. The central section of the specimen's top surface was again coated by an S4 film with a DIC speckle pattern applied to the base layer. A conventional foil strain gauge was attached to the bottom surface near the structural irregularities. The yielding strain of the acrylic specimen was found to be near 20 mε. To keep the deformation test well within the elastic range, strain was limited to 1.7 mε. For the notched specimen, the S4 scanned region on this specimen was a 20×16 $mm^2$ rectangular area. To increase spatial resolution, the S4 read head position was scanned in steps of 0.2 mm, giving a total of 8181 points over the whole ROI. For the holed specimen, the S4 scanned region was a 7×7 $mm^2$ square area with steps of 0.1 mm in each direction, giving a total of 5041 points over the ROI. Two scans of the specimen were performed, one before and one after loading, and subtracted the first from the second to account for background spatial irregularities resulting from minor strains induced in the SWCNT sensors during film curing.

Figures 6A, 6B, 6C, 6D, 6E, 6F:
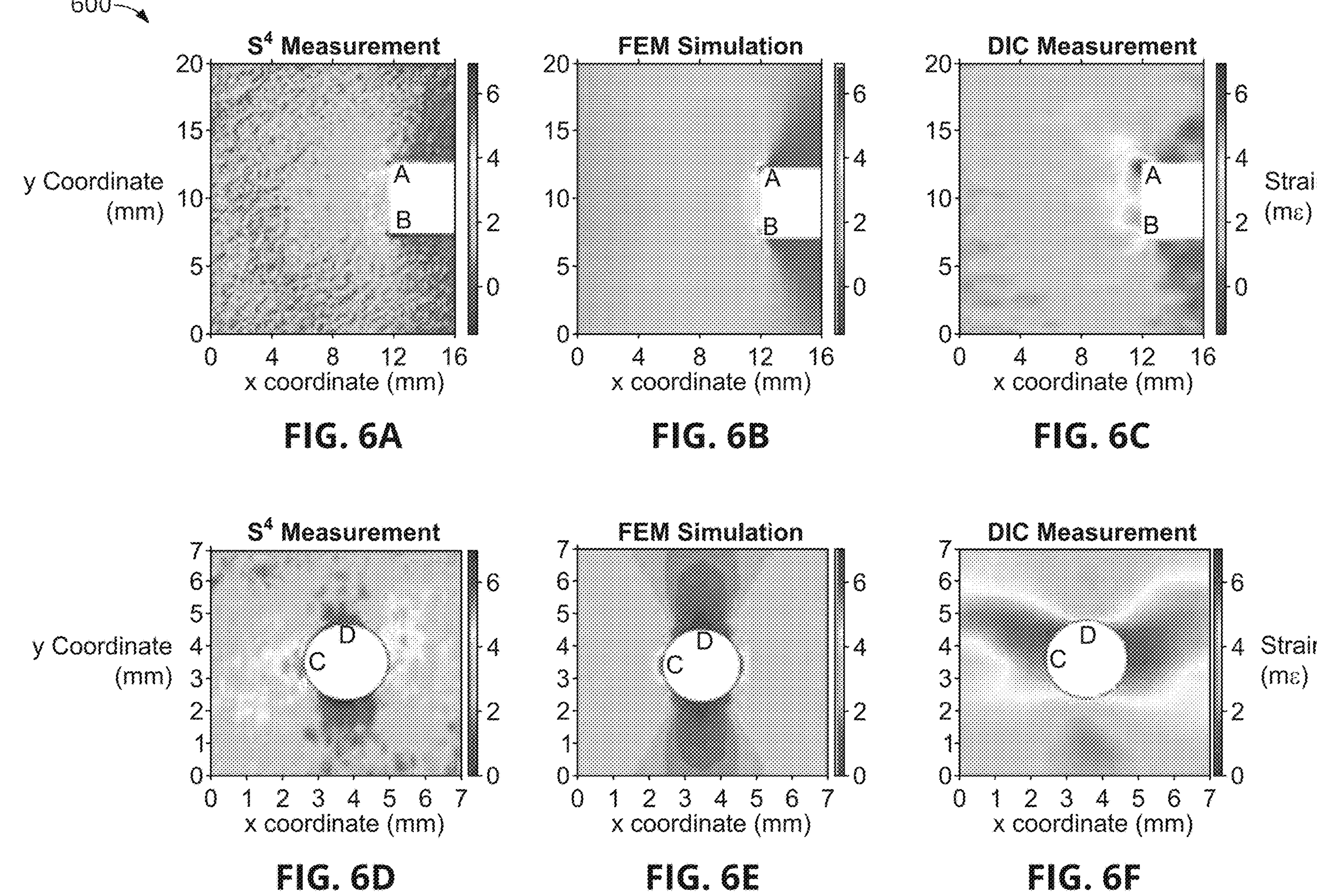
FIGS. 6A-6F depict example data in accordance with one or more embodiments.

FIG. 6 shows the resulting net strain map using the strain mapping system and method described above. In FIG. 6 the color-coded strain maps using the S4 method are compared with a simulated finite element method (FEM) model and strain maps produced using conventional DIC methods. Both the S4 and DIC maps give strains with magnitudes similar to the FEM simulation result, but with significantly different spatial details. In particular, the strain map from S4 shows finer spatial detail and agrees more closely with the simulation results. This is evident from the two strong strain concentrations located at the inner corners of the notch (points marked A and B). S4 reveals highly localized strain maxima indicated by the red spots, accurately capturing the large strain gradients. These strongly resemble the localized maxima in the FEM simulation. By contrast, those maxima appear diffuse and somewhat displaced in the DIC strain map. For the specimen with the hole, S4 map reports much more accurate strains than DIC, particularly at the high strain gradients near the hole.

Figures 7A, 7B, 7C, 7D:
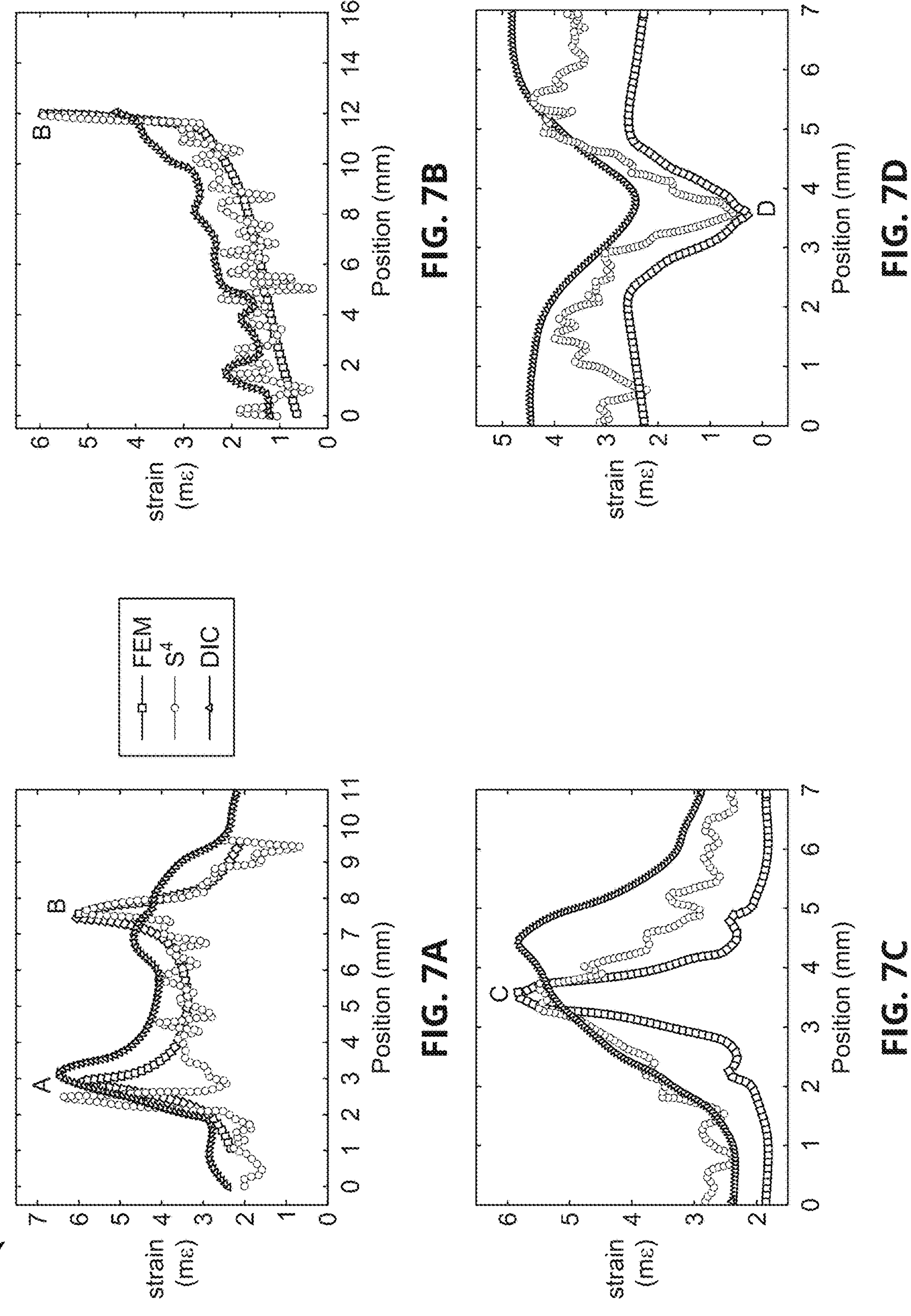
FIGS. 7A-7D depict example data in accordance with one or more embodiments.

FIG. 7A shows strain profiles of the notched specimen along the vertical line connecting points A and B. FIG. 7B shows strain profiles along the horizontal line passing through the bottom of the notch at point B. Comparing to the FEM profile, both S4 and DIC successfully capture the first peak at point A. However, the DIC peak at point B is excessively broadened, too low in magnitude, and inconsistent with the specimen's symmetry. In FIG. 7B, DIC underestimates the peak strain at point B by nearly 2 mε.

To compare results for the holed specimen in the lower frames FIG. 6, FIG. 7C shows strain profiles along the vertical line through point C. FIG. 7D shows profiles along the horizontal line through point D. S4 captures the magnitudes and symmetric positions of peak strain in good agreement with the FEM simulations, whereas DIC errs in position in FIG. 7*c* and in magnitude by nearly 2 mε in FIG. 7*d*. The discrepancies result from numerical errors and VSG spatial smoothing in DIC image processing. Thus, as it does not trade spatial resolution for strain resolution, the S4 method more accurately detects highly localized regions of large/peak strains (with steep strain gradients). Such strain concentrations and steep strain gradients at edges, corners and crack tips are in general not captured by DIC, yet they must be detected in structural maintenance and health inspections because they may lead to material and structural failures.

Figures 8A, 8B, 8C, 8D:
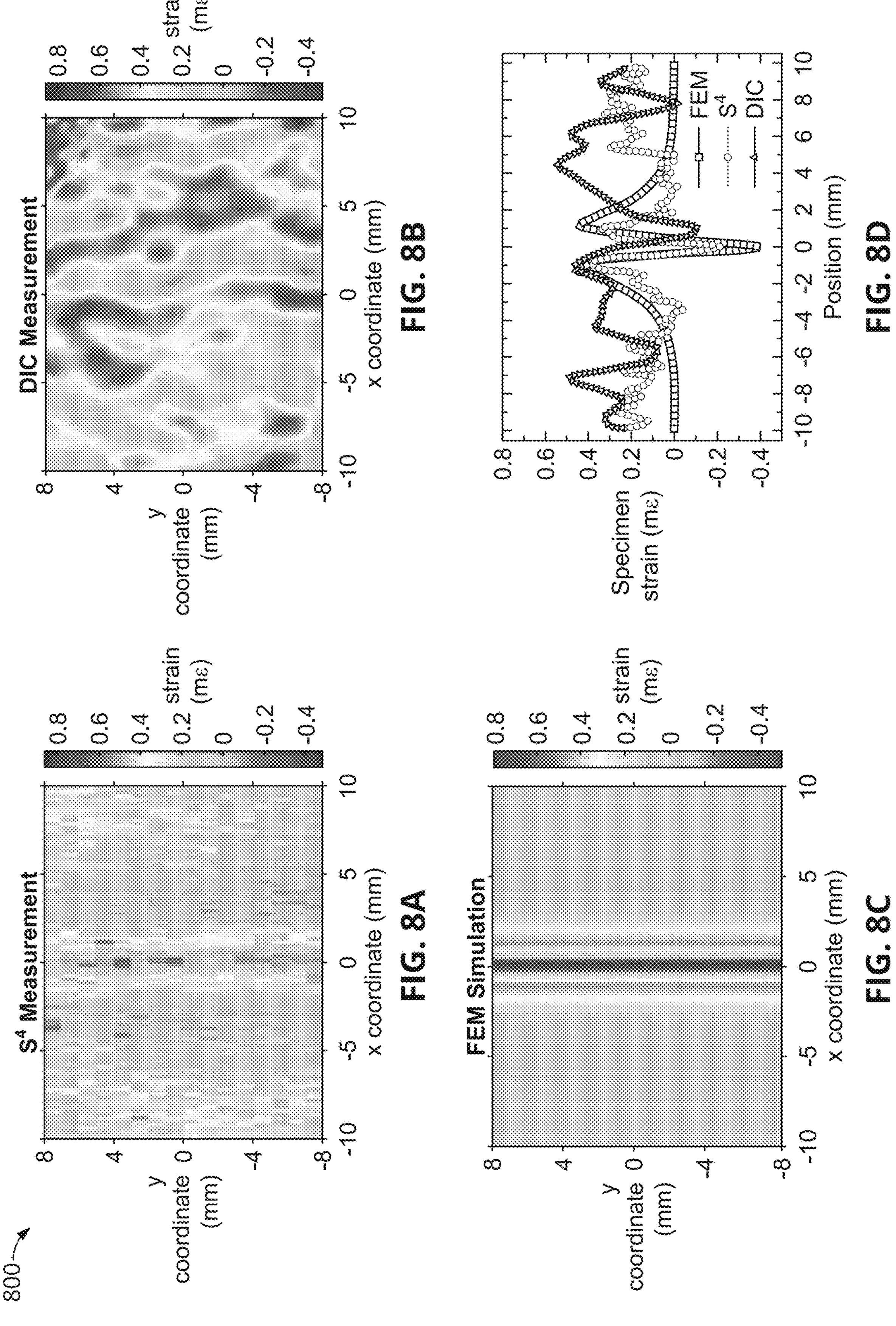
FIGS. 8A-8D depicts example data in accordance with one or more embodiments.
Figures 9A, 9B, 9C, 9D:
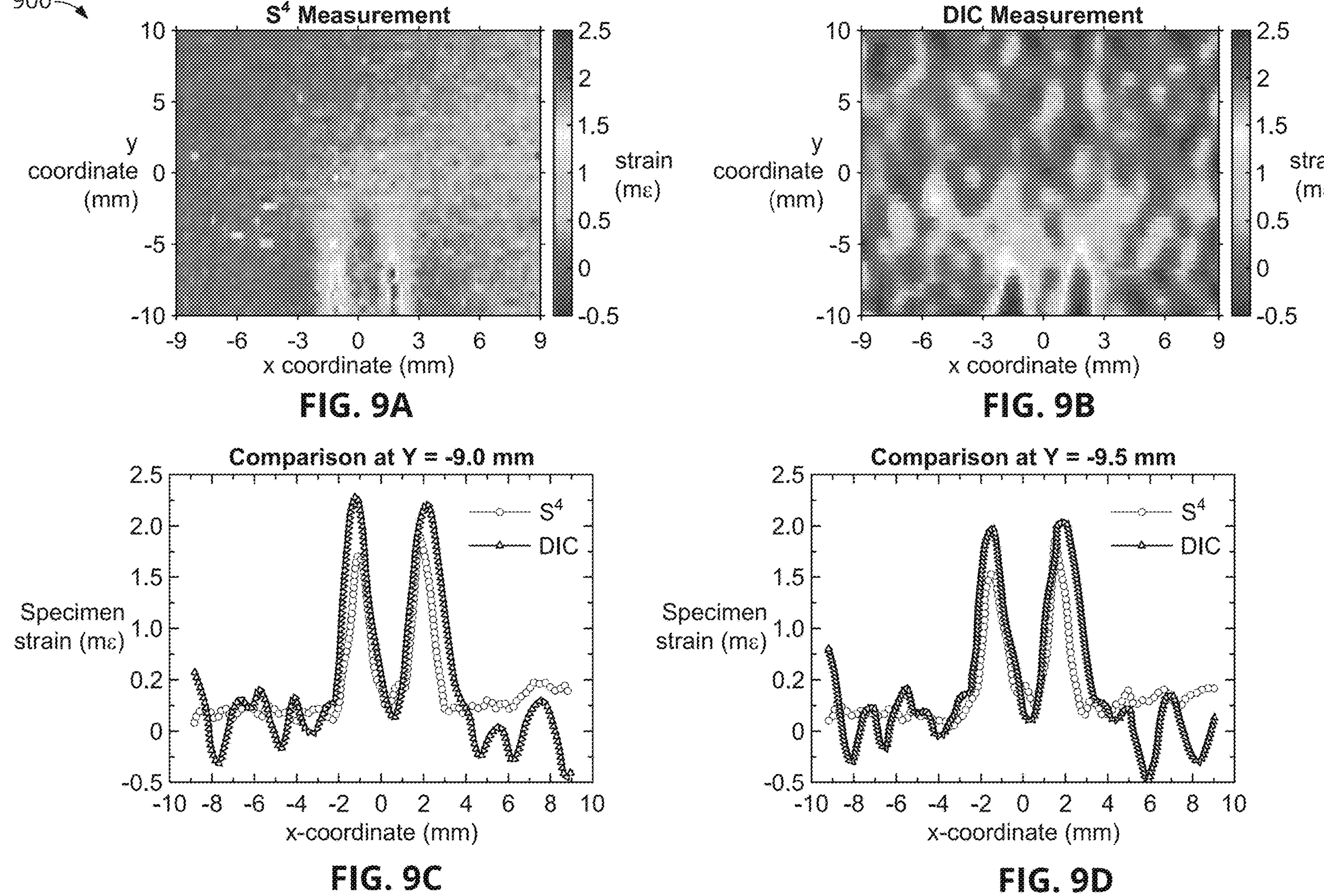
FIGS. 9A-9D depicts example data in accordance with one or more embodiments.

FIGS. 8A-8C depicts the strain maps and FIG. 8D strain profiles for another example specimen of two 6.4 mm thick, 25.4 mm wide aluminum plates with subsurface defects. A 3.8 mm hole was drilled through the entire specimen width along the y-axis to create the defect in one aluminum plate. In the other, the hole extended only through one third of the width. These examples are intended to test whether the internal structural damage represented by the holes could be detected from surface strain measurements after tensile loading along the x-axis. To account for possible out-of-plane motion during loading, the 3D version of conventional DIC methods is applied for both specimens.

FIGS. 8A-8C compares the results for the first specimen (with a through hole). A controlled tensile load (stress) was applied to the specimen to just exceed the yielding point before releasing, so that a small residual strain remained in the plate. A single band of compressive strain (blue region) sandwiched between two bands of tensile strain concentration (yellow/red regions) can clearly be identified in the S4 map and the FEM simulation. As shown by the strain profiles plotted in FIG. 8D, S4 and FEM agree well near the center, with both showing similar positive-negative-positive strain patterns, negative-going peaks at x=0 mm, and amplitudes matching within 0.2 mε. Discrepancies can be seen at locations more than 5 mm from the center, where the S4 map suggests increased strain whereas FEM predicts strain falling to zero. The symmetric pattern in the S4 map suggests that this mismatch may represent a real physical effect that was not properly captured in the FEM simulation. The DIC strain map has a higher noise level than S4 and is less successful in locating the main negative feature or revealing the overall strain pattern. This test therefore shows that the S4 method is more effective than DIC in detecting hidden damage in specimens with surface strains below 1 mε.

The final test specimen had larger strains that were induced by tensile loading after a 3.8 mm hole had been drilled through one-third of its width to represent internal (sub-surface) damage. The measurement results are shown in FIGS. 9A-9D. In this case, comparison with FEM simulation was not possible because of uncertainties in the specimen's post-yield material parameters and eccentricity in loading. The latter is evident in the S4 asymmetric strain map in FIG. 9A. Here, there is a clear difference between right and left peak magnitudes even though they would be expected to match by symmetry. The S4 and the DIC strain maps agree qualitatively in showing two strips of strain concentration that are greatest at the drilled edge of the plate and gradually dissipate near the end of the drilled hole. This strain pattern reflects the subsurface structural defect. In comparison to the results shown in FIGS. 8A-8D, one can see that the DIC map quality is improved for this higher strain (up to 2 mε) case. To more quantitatively display results from S4 and DIC, strain profiles at y=−9.0 mm and y=−9.5 mm are plotted in FIGS. 9C and 9D. There is a considerable discrepancy of about 0.4 mε in the maximum strain values found by the two methods. The S4 profiles show lower noise, sharper features, and a more consistent difference between the amplitudes of the peaks at positive and negative x-coordinates, which we attribute to eccentric loading. The DIC profiles show compressive strain at certain locations, which is incorrect. This final test case suggests that S4 mapping quantitatively remains superior to DIC in this higher strain regime of up to 2 mε.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed:

1. A strain mapping system for producing a strain map of an object, comprising:

a nanomaterial configured to be applied to a surface of the object as a film, an imager configured to acquire a background image and a plurality of spectrally indexed object images, the imager comprising;

a polarized light source configured to irradiate the film with polarized light, a camera configured to record a fluorescence of a light emitted from the film, a tunable spectral filter configured to pass a range of wavelengths of the light emitted from the film, one or more image processing algorithms configured to determine an induced strain value at each pixel in each image of the plurality of spectrally indexed object images by subtracting a reference strain value of the background image and dividing by a stress gauge factor; and one or more computer processors communicatively coupled to the imager;

wherein the stress gauge factor is calculated as $\gamma=-\delta(\lambda_{(7,6)}-\lambda_{(7,5)})/\delta_\varepsilon$ where $\gamma$ is the stress gauge factor, SE is a change in the object strain, $\lambda_{(7,6)}$ is a first wavelength peak and $\lambda_{(7,5)}$ is a second wavelength peak of the light emitted from a test film;

wherein the strain mapping system is configured to produce a strain map of the object, wherein the strain map, $\varepsilon(x, y)$, is obtained by $\varepsilon(x, y)=[\delta_1 (x, y)-\delta_0 (x, y)]/\gamma$ where $\delta_0(x,y)$ is a reference strain map of the object that is obtained from the background image, $\delta_1 (x,y)$ is an object strain array based on the induced strain value at each pixel in each image of the plurality of spectrally indexed object images and $\gamma$ is the stress gauge factor.

2. The strain mapping system of claim 1, wherein the polarized light source is an excitation laser configured to emit polarized light within a predetermined wavelength band.

3. The strain mapping system of claim 2, wherein the predetermined wavelength band is within an infrared wavelength range.

4. The strain mapping system of claim 1, wherein the strain mapping system is configured to produce the strain map for a plurality of angles of polarization of the polarized light source.

5. The strain mapping system of claim 4, wherein the strain map obtained from the plurality of angles of polarization determines a strain anisotropy.

6. The strain mapping system of claim 1, wherein the film further comprises a multi-layer coating wherein the multi-layer coating comprises an opaque base layer, a high gloss primer layer, a sensing layer, and a protective top layer.

7. The strain mapping system of claim 1, wherein the tunable spectral filter further comprises a wide band pass filter and a narrow band pass filter.

8. The strain mapping system of claim 1, wherein the background image and the plurality of spectrally indexed object images capture an area of the object.

9. The strain mapping system of claim 1, wherein the nanomaterial comprises single-walled carbon nanotubes (SWCNTs).

10. A method for producing a strain map of an object using a strain mapping system comprising a nanomaterial, a camera, a polarized light source, a tunable spectral filter, one or more image processing algorithms and one or more computer processors communicatively coupled to the imager, the method comprising:

acquiring, with the camera, a background image;

irradiating, with the polarized light source, a film of the nanomaterial disposed on a surface of the object wherein a fluorescence of a light is emitted from the film in response to irradiating the object;

acquiring, with the camera, a plurality of spectrally indexed object images of the object wherein the plurality of spectrally indexed object images has a calibration dataset of spatial and spectral calibration data;

correcting, with the one or more image processing algorithms, intensities of the plurality of spectrally indexed object images using the background image and the calibration dataset;

identifying, with the one or more image processing algorithms, a spectral index with a maximum intensity for a plurality of pixels in the spectrally indexed object images;

determining, with the one or more image processing algorithms, an interpolated index of a true maximum intensity;

determining, with the calibration dataset, a reference wavelength of the interpolated index of the true maximum intensity;

calculating, using the reference wavelength and a spectral gauge factor, a plurality of local strain values comprising a strain value at each pixel in each image of the plurality of spectrally indexed object images determined by subtracting a reference strain value of the background image and dividing by a stress gauge factor;

producing, with the one or more image processing algorithms and the plurality of local strain values, a strain map of the object, wherein the strain map, $\varepsilon(x, y)$, is obtained by $\varepsilon(x, y)=[\delta_1(x, y)-\delta_0(x, y)]/\gamma$ where $\delta_0(x,y)$ is a reference strain map of the object that is obtained from the background image, $\delta_1(x,y)$ is an object strain array based on the induced strain value at each pixel in each image of the plurality of spectrally indexed object images and $\gamma$ is the stress gauge factor; and storing, on the one or more computer processors, the strain map of the object;

wherein the stress gauge factor is calculated as $\gamma=-\delta(\lambda_{(7,6)}-\lambda_{(7,5)})/\delta\varepsilon$ where $\gamma$ is the stress gauge factor, $\delta_\varepsilon$ is a change in the object strain, $\lambda_{(7,6)}$ is a first wavelength peak and $\lambda_{(7,5)}$ is a second wavelength peak of the light emitted from a test film.

11. The method of claim 10, wherein determining an interpolated index of a true maximum intensity further comprises:

fitting, with the one or more image processing algorithms, a curve for a plurality of intensities versus a plurality of index points;

wherein the curve is a second-order polynomial function or a third-order polynomial function.

12. The method of claim 10, wherein calculating a plurality of local strain values further comprises:

correlating the fluorescence of the light emitted from the film to a presence of strain; and determining a wavelength of the light emitted from the film;

wherein a shift of the wavelength of the light emitted from the film indicates a local strain.

13. The method of claim 10, wherein producing a strain map of the object is repeated for a plurality of angles of polarization of the polarized light source.

14. The method of claim 13, wherein the strain map obtained from the plurality of angles of polarization determines a strain anisotropy.

15. The method of claim 10, wherein the polarized light source is an excitation laser configured to emit polarized light within a predetermined wavelength band.

16. The method of claim 15, wherein the predetermined wavelength band is within an infrared wavelength range.

17. The method of claim 10, wherein the background image and the plurality of spectrally indexed object images capture an area of the object.

18. The method of claim 10, wherein the film further comprises a multi-layer coating wherein the multi-layer coating comprises an opaque base layer, a high gloss primer layer and a sensing layer.

19. The method of claim 10, wherein the nanomaterial comprises single-walled carbon nanotubes (SWCNTs).

* * * * *